O. F. SMITH.
SIDE DELIVERY RAKE AND TEDDER.
APPLICATION FILED DEC. 7, 1909.

1,043,476.

Patented Nov. 5, 1912.

3 SHEETS—SHEET 2.

Witnesses:
Frank W. Bemun
Hildur C. Petersen

Inventor:—
Orbin F. Smith

By: Fred Gerlach
his Atty.

O. F. SMITH.
SIDE DELIVERY RAKE AND TEDDER.
APPLICATION FILED DEC. 7, 1909.

1,043,476.

Patented Nov. 5, 1912.

3 SHEETS—SHEET 3.

Witnesses:—
Frank W. Bemun
Hilder C. Petersen

Inventor:—
Orbin F. Smith
By:— Fred Gerlach
his Atty:—

UNITED STATES PATENT OFFICE.

ORBIN F. SMITH, OF OTTUMWA, IOWA, ASSIGNOR, BY MESNE ASSIGNMENTS, TO EMERSON-BRANTINGHAM COMPANY, OF ROCKFORD, ILLINOIS, A CORPORATION OF ILLINOIS.

SIDE-DELIVERY RAKE AND TEDDER.

1,043,476.  Specification of Letters Patent.  Patented Nov. 5, 1912.

Application filed December 7, 1909. Serial No. 531,797.

*To all whom it may concern:*

Be it known that I, ORBIN F. SMITH, a resident of Ottumwa, in the county of Wapello and State of Iowa, have invented certain new and useful Improvements in Side-Delivery Rakes and Tedders, of which the following is a full, clear, and exact description.

The invention relates to side-delivery rakes and tedders.

One object of the invention is to provide a simple driving-connection for the crank-shaft for reciprocating the rake.

Another object of the invention is to provide an improved construction, whereby the forks may be readily reversed to act as tedders when desired.

In side-delivery rakes of the class to which the invention relates, it has heretofore been common, to provide an intermediate shaft comprising sections connected by a universal joint, between the power wheel or gear on one of the traction wheels and the crank-shaft for operating the rakes; or to provide intermediate gearing or connections for the same purpose.

The present invention designs to provide a machine in which a single intermediate drive-shaft, having a gear at one end for engaging a gear on the crank shaft and a pinion on its other end for engaging the driving gear on the traction-wheel, constitutes a direct driving-connection for the crank-shaft in such manner that the use of intermediate gear-mechanism, or universal joints will be obviated, the intermediate drive-shaft extending directly between the crank-shaft and the driving-gear. Thus an extremely simple drive-mechanism is provided.

The invention further provides an improved construction in which the crank-shaft with the forks thereon is removable and reversible together with the gear on the crank-shaft so that by reversing the relation of the shaft to the supporting-frame, the forks will be reversed to toss the hay backwardly to act as a tedder, and the crank-shaft will be driven in opposite direction to that in which it is driven when it is used as a side-delivery rake by reason of the reversal of the gear with the shaft.

The invention consists in the several novel features hereinafter set forth and more particularly defined by claim at the conclusion hereof.

Figure 1:
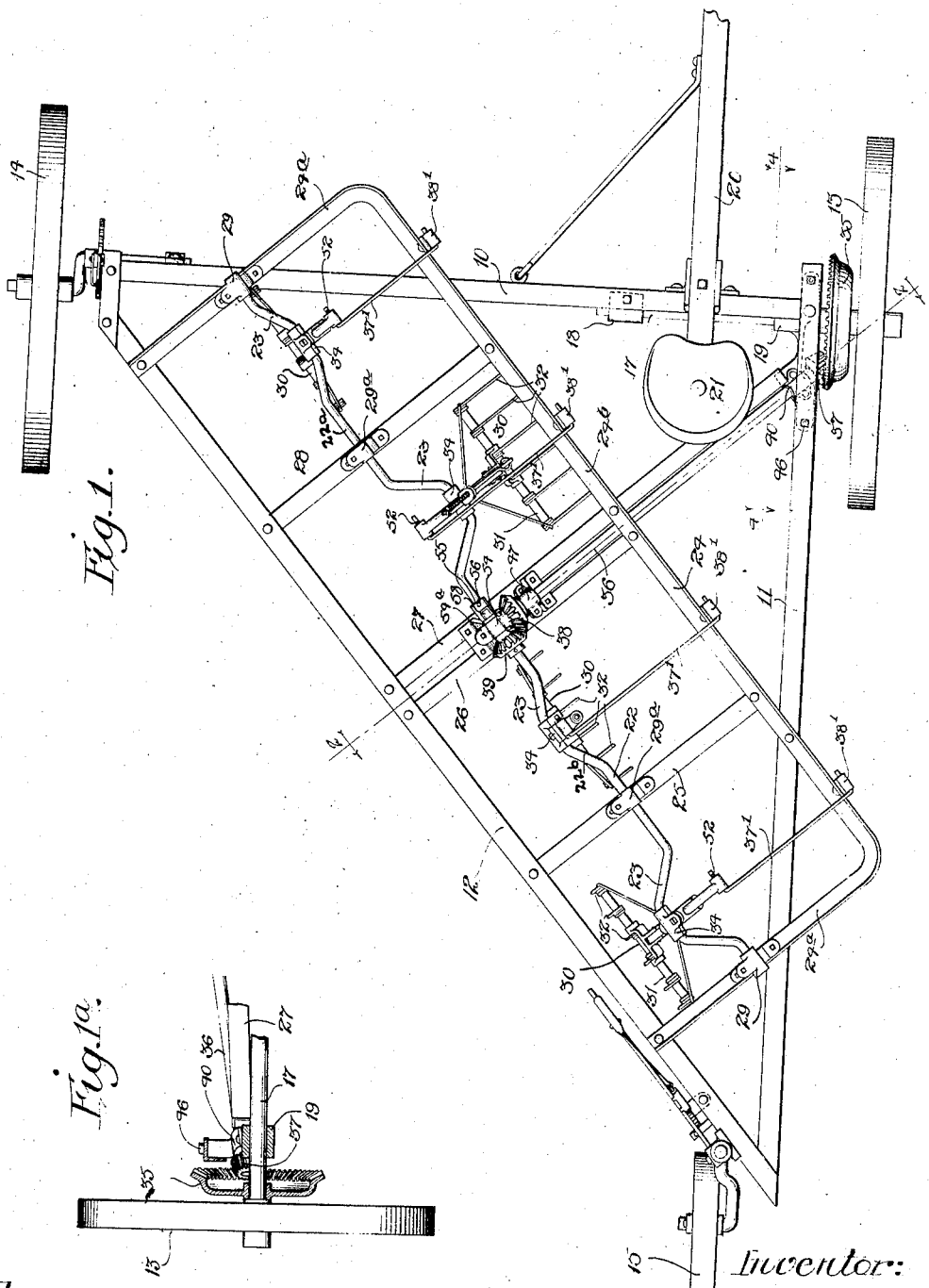
Figure 2:
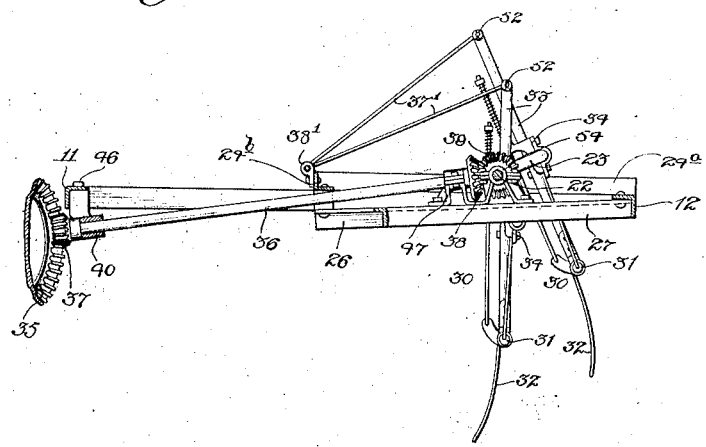
Figure 3:
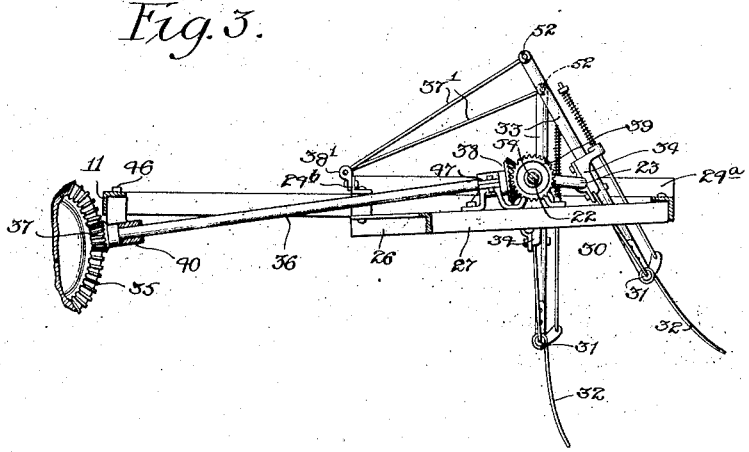
Figure 4:
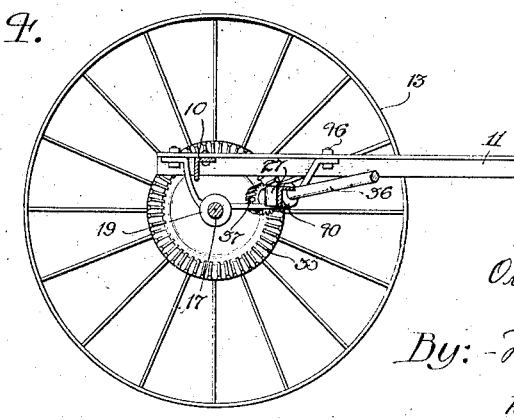
Figure 5:
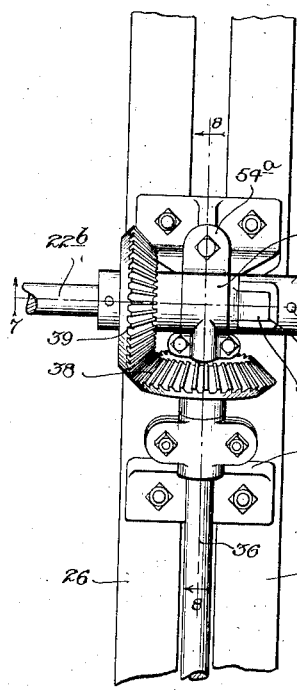
Figure 6:
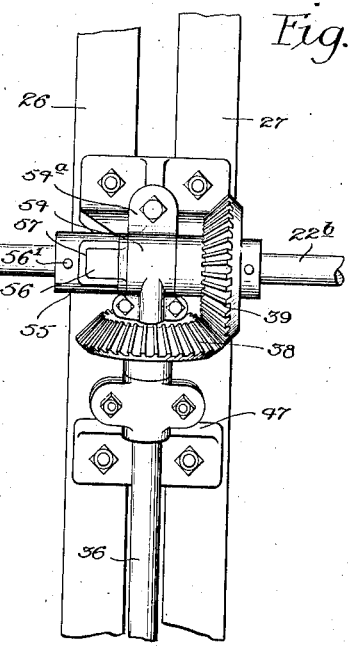
Figure 7:
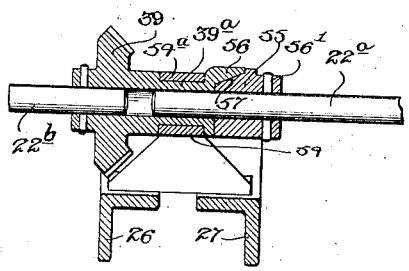
Figure 8:
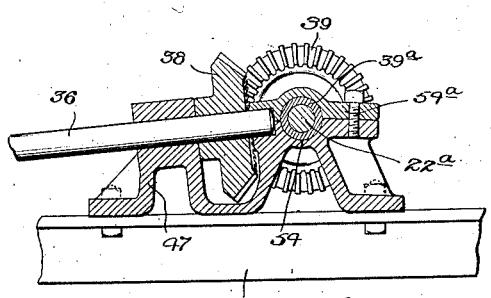
Figure 9:
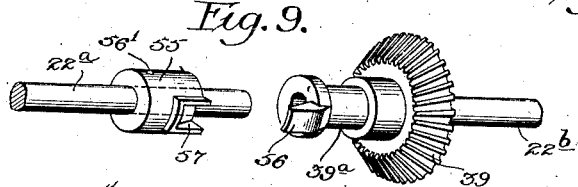
Figure 10:
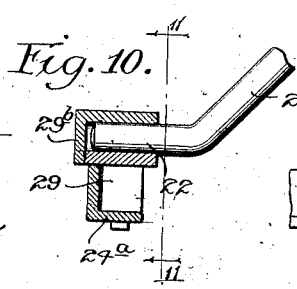
Figure 11:
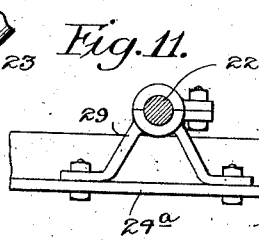

In the drawings: Figure 1 is a plan of a machine embodying the invention, the parts being shown in relation to cause the forks to toss the hay forwardly and laterally to deliver it in a continuous windrow. Fig. 1ª is a transverse vertical section looking toward the rear of the machine, through the axis of the shaft of the traction-wheel, the latter and the shaft being shown in elevation. Fig. 2 is a section taken on line 2—2 of Fig. 1. Fig. 3 is a similar view, the parts being shown in position assumed when the forks have been reversed to act as a tedder. Fig. 4 is a section on line 4—4 of Fig. 1. Fig. 5 is a detail plan of a portion of the crank-shaft and the inner end of the intermediate shaft with the gears thereon, the parts being shown in position to operate the forks to rake the hay into windrows. Fig. 6 is a similar view, showing the parts organized to operate the crank-shaft in reverse direction so the machine will operate as a tedder. Fig. 7 is a section on line 7—7 of Fig. 5. Fig. 8 is a section on line 8—8 of Fig. 5. Fig. 9 is a perspective of the inner ends of crank-shaft sections which are adapted to be coupled together. Fig. 10 is a detail section through one of end-bearings for the crank-shaft. Fig. 11 is a section on line 11—11 of Fig. 10.

The machine comprises a triangular frame constituted of a front rail 10, a side rail 11 and a diagonal rail 12, which are secured together and this frame is supported and carried by a traction-wheel 13 at one side of the front thereof, a carrying-wheel 14 at the other side and a trail or caster-wheel 15 at the rear. The caster-wheel 15 and carrying-wheel 14 are each adjustably connected to the frame, so that the elevation of the frame, with respect to the ground, may be varied by suitable mechanism, such as a lever and rack in manner well understood in the art. A short axle 17 is mounted in suitable brackets 18 and 19 secured to and depending from the frame, and extends laterally beyond the frame, so that it will be carried in the hub of the traction-wheel 13 to sustain the frame. A drafttongue 20 is connected to the frame and a seat 21 is usually provided for the operator.

A crank-shaft 22 is mounted on the supporting-frame and is provided with a series of cranks 23, one for each fork to be operated. A tri-lateral frame 24 comprising end-bars 24$^a$ and a connecting bar 24$^b$ usually of angle-iron, is secured to the supporting-frame and cross-bars 25, 26, 27 and 28. The crank-shaft is removably journaled at each end in a sectional box 29 secured to the frame 24. This shaft extends obliquely to the line of draft and the forks are disposed laterally and rearwardly of one another to successively toss the hay laterally and within the sweep of the next fork to cause the hay to be delivered at the side of the machine in a continuous windrow. The crank-shaft is also removably journaled in sectional boxes 29$^a$ which are secured to cross-bars 25 and 28. The shaft is held against end-play by walls or abutments 29$^b$ on the outer sides of journal-boxes 29 (Fig. 10) combined against endwise movement in the frame.

A suitable fork 30 is operated by each crank 23 on shaft 22 and each of these forks comprises a fork-head 31 on which spring-teeth 32 connected to and extending upwardly from the fork-head and a journal 34 on the standard for the crank. The upper end of each standard 33 is pivotally connected to a lug 38' on the supporting-frame. The cranks on shaft 22 are offset with respect to one another and when rotated cause the forks to be reciprocated or raised and lowered to successively sweep over the ground as the machine travels forwardly. The lower end of the teeth 32 are curved to lift the hay from the ground and the fork thus tosses the hay laterally to the next series, the last delivering the hay in a windrow at the side of the machine. The mechanism for driving the crank-shaft to operate the forks, comprises an internally toothed gear-wheel 35, which is concentrically mounted with the traction-wheel 13, and driven thereby. An intermediate shaft 36 is provided at one end with a pinion 37 meshing with gear-wheel 35 and at its other end with a beveled gear 38 adapted to mesh with a beveled gear 39 on the crank-shaft. Shaft 36 is mounted in a journal 40 in bracket 19, which is secured to rail 11 of the supporting-frame by a bolt 46. Adjacent its other end shaft 36 is journaled in a bearing in a sectional bracket 47, which is bolted to frame-bars 26 and 27. Bar 27 extends forwardly of tri-lateral frame-bar 24$^b$ to bracket 19 which is secured to the rail 11 of the frame to provide a rigid frame-structure whereby the driven wheel 35 and the gear 39 on the tively secured against stresses which would retard rotation, this bar 27 serving as an inclined cross-member which maintains the parts of the driving-connection in proper relation. The cross bar 26 and the cross bar 27 provide a support for the bracket 47 in which the inner end of the shaft 36 is journaled. Drive-shaft 36 extends angularly downward and directly between the crank-shaft and gear 35 in such relation to gear 35, that the crank-shaft will be directly driven by a single shaft having a gear-connection at each end for the traction-driven wheel 35 and the gear 39 on the crank-shaft respectively. This shaft 36 extends downwardly and forwardly from its inner end so that the outer or front end will be properly positioned to carry pinion 37 for direct engagement with the teeth on the driving gear 35. Therefore, this shaft with a gear at each end serves to drive the crank-shaft directly, without the use of a universal joint or intermediate gear-mechanism or a plurality of shafts.

The invention also designs to provide an improved machine in which the forks are reversibly mounted and the crank-shaft may be driven in opposite directions to cause these forks to act either as a side-delivery rake or as a tedder. In order to facilitate conversion of the machine for use as a tedder, in lieu of a side-delivery rake, the crank-shaft with the forks thereon is reversible to bring the forks in rearwardly facing relation to the frame, so they will deliver the hay rearwardly, instead of forwardly and laterally. By providing a reversible crank shaft, the forks may conveniently be brought to face rearwardly instead of forwardly and simultaneously the position of the gear 39 will be reversed with respect to gear 38 on the intermediate shaft 36 so that the crank-shafts and forks will be driven in opposite direction as a result of the reversal of the shaft without the interposition of the reversing-gear and other mechanism. In order to permit this reversal, each of the journal-boxes in which the shaft is journaled is formed of sections so that the upper or cap section of each may be removed to permit removal of the shaft and reversal thereof, that is, so that the front end of the shaft may be placed into the rearmost journal or vice versa. To permit this reversal of the forks, the upper ends thereof are detachably connected to the links 37', each of the latter having a pivot-terminal extending through a socket in the upper end of the fork-standard 33 and held therein by a removable cotter-pin 52. The crank-shaft is usually of such length that it is inconvenient to handle for reversal by a single person and to facilitate the reversing operation, crank-shaft 22 is formed of sections 22$^a$ and 22$^b$. The hub of gear 39 is extended to fit in a journal 54 formed in bracket 47. Bracket 47 comprises a removable cap 54ª and the extended hub 39ª of gear 39 is adapted to receive the inner end of the shaft section 22ª to keep the shaft-sections alined. A collar 55 is secured to shaft-sections 22ª by a pin 56' and is formed with a pocket 57 adapted to receive a projecting lug 56 on the hub of gear 39 to operatively connect the shaft-sections, so that one will be driven with the other. End-bearings 29 hold the shaft-sections together longitudinally. As a result of this construction, the shaft may be reversed in sections and more conveniently manipulated by one person.

Assuming the machine to be assembled for use as a side-delivery rake, as shown in Figs. 1 and 2 of the drawings, crank-shaft 22 will be driven as the machine is driven from the ground by carrying-wheel 13, gear-wheel 35, pinion 37, intermediate shaft 36 and gears 38 and 39. The crank-shaft will be rotated to operate the forks vertically and to cause them to deliver and toss or rake the hay from one rake to the next, so that it will be delivered in a substantially continuous windrow at one side of the machine. When it is desired to use the machine as a tedder (assuming the parts to be as shown in Fig. 1), the shaft should be driven in opposite direction and the forks should be reversed to cause them to toss and lift the hay rearwardly without successively delivering the hay from one fork into the sweep of the next. To effect such operation, it is only necessary to remove the caps of the bearings in which the crank-shaft is held and disconnect the upper ends of the fork standards 33 by removing cotter-pins 52. The sections of the crank-shaft may be then separately removed, each with the forks connected thereto and reversely placed in the frame. By thus reversing the crank-shaft, gear-wheel 39 will be brought into engagement with the opposite side of gear 38, so that without the use of a reversing gear or additional gear mechanism, the shaft will be driven in reverse direction. When the caps of the journal-boxes for shaft 22 have been replaced and each of the links 37 have been connected to the upper end of one of the fork-standards, the machine will operate as a tedder, the crank-shaft being driven in reverse direction and the forks facing rearwardly to toss the hay rearwardly and laterally as the machine travels forwardly over the ground.

The invention thus provides a simple driving mechaism for the crank-shaft and simple mechanism for reversing the crank-shaft and forks in the frame to effect rotation thereof by the same mechanism.

The invention is not to be understood as restricted to the details shown and described, since these may be modified within the scope of the appended claims without departing from the spirit and scope of the invention.

Having thus described the invention, what I claim as new and desire to secure by Letters Patent, is:

1. In a side-delivery rake, the combination of a frame, carrying-wheels, a crank-shaft mounted on the frame, reciprocating forks operatively connected to said crank-shaft, said crank-shaft and forks being disposed obliquely to the line of draft, and a driving-connection for said crank-shaft comprising a gear-wheel driven by and mounted to rotate with one of the carrying-wheels, a gear-wheel on the crank-shaft, an intermediate shaft extending directly between said gears, a pinion on the outer end of said intermediate shaft engaging the gear-wheel rotating with the carrying-wheel and a gear at the inner end of said shaft meshing with the gear on the crank-shaft.

2. In a side-delivery rake, the combination of a frame, carrying-wheels, a crank-shaft mounted on the frame, reciprocating forks operatively connected to said crank-shaft, said crank-shaft and forks being disposed obliquely to the line of draft, and a driving-connection for said crank-shaft comprising an internally toothed gear-wheel driven by and mounted to rotate with one of the carrying-wheels, a gear-wheel on the crank-shaft, an intermediate shaft extending directly between said gears, a pinion at the outer end of said intermediate shaft engaging the gear-wheel rotating with the carrying-wheel and a gear at the inner end of the shaft meshing with the gear on the crank-shaft.

3. In a side-delivery rake, the combination of a frame, carrying-wheels, a crank-shaft mounted on the frame, reciprocating forks operatively connected to said crank-shaft, said crank-shaft and forks being disposed obliquely to the line of draft, and a driving-connection for said crank-shaft comprising a gear-wheel driven by and mounted to rotate with one of the carrying-wheels, a gear-wheel centrally disposed on the crank-shaft, an intermediate shaft extending directly between said gears, a pinion at the outer end of said intermediate shaft engaging the gear-wheel rotating with the carrying-wheel and a gear at the inner end of said shaft meshing with the gear on the crank-shaft.

4. In a side-delivery rake, the combination of a frame, carrying-wheels, a crank-shaft mounted on the frame, reciprocating forks operatively connected to said crank-shaft, said crank-shaft and forks being disposed obliquely to the line of draft, and a driving-connection for said crank-shaft comprising a gear-wheel driven by and mounted to rotate with one of the carrying-wheels, a gear-wheel on the crank-shaft, an intermediate shaft extending directly between said gears, a pinion at the outer end of said intermediate shaft engaging the gear-wheel rotating with the carrying-wheel and a gear at the inner end of said shaft and meshing with the gear on the crank-shaft, the gear-wheel on the crank-shaft being reversible to drive the crank-shaft in either direction.

5. In a combined side-delivery rake and tedder, the combination of a supporting-frame, carrying-wheels, a crank-shaft disposed obliquely to the line of travel and removably and reversibly mounted in the frame, reciprocable forks operatively connected to the crank-shaft and mechanism for driving the crank-shaft.

6. In a combined side-delivery rake and tedder, the combination of a supporting-frame, carrying-wheels, a crank-shaft disposed obliquely to the line of travel and removably and reversibly mounted in the frame, reciprocable forks operatively connected to the crank-shaft and mechanism for driving the crank-shaft, said forks being reversible with the crank-shaft.

7. In a combined side delivery-rake and tedder, the combination of a supporting-frame, carrying-wheels, a crank-shaft disposed obliquely to the line of travel, journals on the frame in which the crank-shaft is removably held, the latter being reversible in the frame, reciprocable forks connected to the crank-shaft and reversible therewith and driving-mechanism for said crank-shaft.

8. In a combined side delivery-rake and tedder, the combination of a supporting-frame, carrying-wheels, a crank-shaft disposed obliquely to the line of travel and reversibly mounted on the frame, reciprocable forks connected to said crank-shaft, means for guiding the forks, detachable connections for said guides and mechanism for driving the crank-shaft.

9. In a combined side delivery-rake and tedder, the combination of a supporting-frame, carrying-wheels, a crank-shaft disposed obliquely to the line of travel and reversibly mounted on the frame, reciprocable forks connected to said crank-shaft, links for guiding the forks, detachable connections for the links to permit the forks to be reversed, and driving-mechanism for said crank-shaft.

10. In a combined side delivery-rake and tedder, the combination of a supporting-frame, carrying-wheels, a crank-shaft disposed obliquely to the line of travel, reciprocable forks connected to the crank-shaft and driving-mechanism for the crank-shaft comprising a pair of gears, one of which is mounted on the crank-shaft and reversibly mounted to drive the shaft in either direction.

11. In a combined side delivery-rake and tedder, the combination of a supporting-frame, carrying-wheels, a crank-shaft disposed obliquely to the line of travel and removably and reversibly mounted in the frame, reciprocable forks operatively connected to the crank-shaft and driving-mechanism for the crank-shaft comprising a gear on the crank-shaft and reversible therewith.

12. In a combined side delivery-rake and tedder, the combination of a supporting-frame, carrying-wheels, a crank-shaft disposed obliquely to the line of travel and removably and reversibly mounted in the frame, reciprocable forks operatively connected to the crank-shaft and reversible therewith and driving-mechanism for driving the crank-shaft comprising a gear on the crank-shaft and reversible therewith.

13. In a combined side delivery-rake and tedder, the combination of a supporting-frame, carrying-wheels, a crank-shaft disposed obliquely to the line of travel, formed of separable sections and removably and reversibly mounted in the frame, reciprocable forks operatively connected to said shaft, and driving-mechanism for said shaft.

14. In a combined side delivery-rake and tedder, the combination of a supporting-frame, carrying-wheels, a crank-shaft disposed obliquely to the line of travel, formed of separable sections and removably and reversibly mounted in the frame, reciprocable forks operatively connected to said shaft and reversible therewith and driving-mechanism for said shaft.

15. In a combined side delivery-rake and tedder, the combination of a supporting-frame, carrying-wheels, a crank-shaft disposed obliquely to the line of travel and formed of separable sections and removably and reversibly mounted in the frame, reciprocable forks operatively connected to said shaft, and driving-mechanism for said shaft comprising a gear on one of the sections of the crank-shaft and reversible therewith to drive the shaft in either direction.

16. In a combined side delivery-rake and tedder the combination of a supporting-frame, carrying-wheels, a crank-shaft disposed obliquely to the line of travel, and formed of separable sections and removably and reversibly mounted in the frame reciprocable forks operatively connected to said shaft, driving-mechanism for said shaft and end-bearings in which the crank-shaft is mounted, provided with means for holding the shaft against longitudinal movement in the frame.

17. In a side delivery-rake, the combination of a supporting-frame, carrying-wheels, a crank-shaft disposed obliquely to the line of travel and formed of separable sections, a coupling between said sections, reciprocable forks operatively connected to said crank-shaft, end-bearings in which the shaft sections are mounted, provided with means for holding the sections in connected relation, and driving-mechanism for said shaft.

ORBIN F. SMITH.

Witnesses:
 FLORENCE F. SHIELDS,
 EMMET A. WORK.